United States Patent
Roth et al.

(10) Patent No.: US 8,560,186 B2
(45) Date of Patent: Oct. 15, 2013

(54) METHOD FOR IDENTIFYING A DRIVING RESISTANCE OF A MOTOR VEHICLE

(75) Inventors: Martin Roth, Rutesheim (DE); Klaus Bastian, Neuhausen (DE); Tobias Radke, Stuttgart (DE); Peter Megyesi, Leonberg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 255 days.

(21) Appl. No.: 13/080,149

(22) Filed: Apr. 5, 2011

(65) Prior Publication Data

US 2011/0251763 A1    Oct. 13, 2011

(30) Foreign Application Priority Data

Apr. 10, 2010   (DE) .......................... 10 2010 014 565

(51) Int. Cl.
*G06F 7/00*   (2006.01)
(52) U.S. Cl.
USPC ............... 701/51; 701/70; 701/82; 701/90; 701/93; 477/47; 477/49; 477/48; 477/97; 477/118; 180/197; 180/179; 180/176
(58) Field of Classification Search
USPC ................................. 701/51, 70, 93
See application file for complete search history.

(56) References Cited

U.S. PATENT DOCUMENTS

| | | | | |
|---|---|---|---|---|
| 4,843,553 A | * | 6/1989 | Ohata | 701/93 |
| 5,514,050 A | * | 5/1996 | Bauerle et al. | 477/118 |
| 5,525,116 A | * | 6/1996 | Ra et al. | 475/275 |
| 5,860,891 A | * | 1/1999 | Bauerle | 477/48 |
| 6,236,298 B1 | * | 5/2001 | Chen | 336/208 |
| 6,236,928 B1 | * | 5/2001 | Loffler et al. | 701/82 |
| 6,339,749 B1 | * | 1/2002 | Rieker et al. | 702/173 |
| 6,698,398 B2 | * | 3/2004 | Bauerle | 123/399 |
| 2007/0067087 A1 | * | 3/2007 | Ohshima | 701/93 |
| 2009/0216415 A1 | * | 8/2009 | Iwatsuki et al. | 701/70 |
| 2011/0251763 A1 | * | 10/2011 | Roth et al. | 701/51 |

FOREIGN PATENT DOCUMENTS

| | | |
|---|---|---|
| DE | 10 2004 023 580 A1 | 12/2005 |
| DE | 10 2006 000 431 | 3/2007 |
| DE | 10 2006 029 366 A1 | 1/2008 |
| DE | 10 2007 055 757 | 6/2009 |
| EP | 0 944 498 B1 | 9/1999 |

* cited by examiner

*Primary Examiner* — Redhwan K Mawari
(74) *Attorney, Agent, or Firm* — RatnerPrestia

(57) ABSTRACT

A method for identifying a driving resistance of a motor vehicle includes the steps of recording values of control and/or state variables of the vehicle during a driving state of the vehicle when a control route is covered, adapting parameters of a vehicle model and/or a model of the area surrounding the vehicle on the basis of the values of the recorded control and state variables, identifying the driving resistance on the basis of the adapted vehicle model and/or the surrounding area model, wherein the parameters of the vehicle model and/or the surrounding area model are adapted on the basis of a distinction between driving states, wherein these driving states include a driving state of a closed drive train with a positive driver demand torque, a driving state of a closed drive train without a positive driver demand torque, and/or and a driving state with an open drive train.

8 Claims, 2 Drawing Sheets

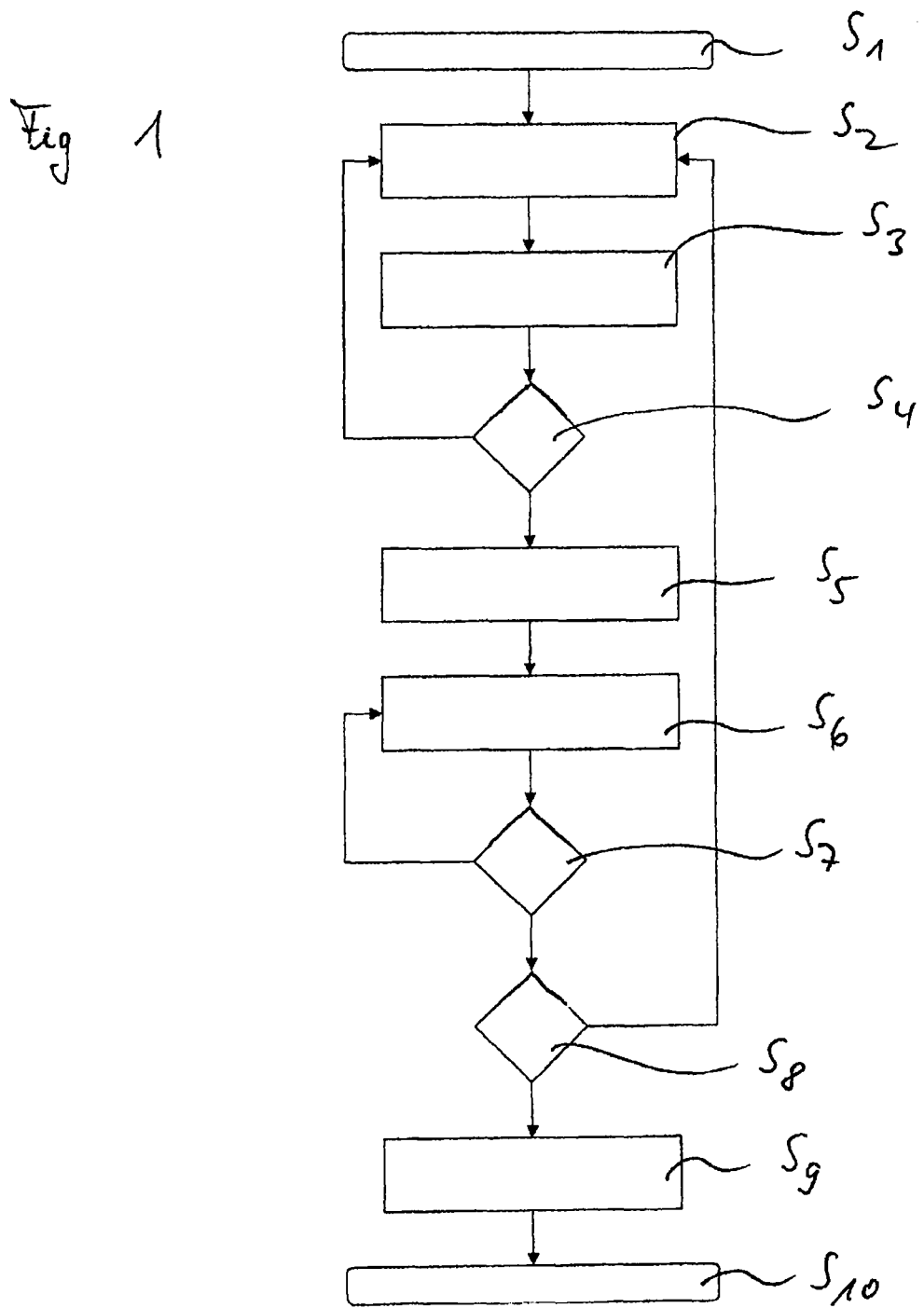

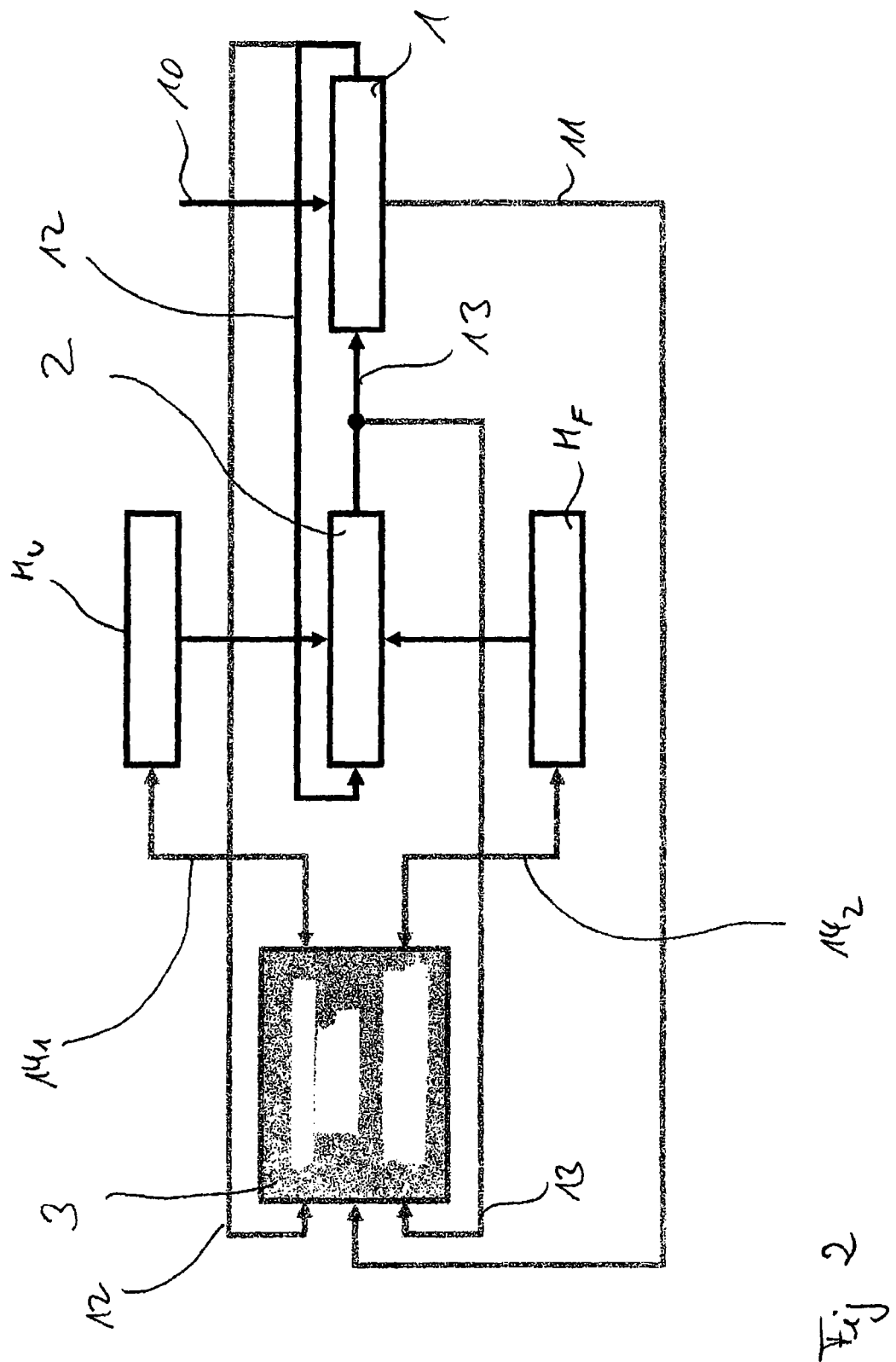

METHOD FOR IDENTIFYING A DRIVING RESISTANCE OF A MOTOR VEHICLE

CROSS REFERENCE TO RELATED APPLICATION

This U.S. patent application claims priority to German Patent Application DE 10 2010 014565.3, filed Apr. 10, 2010, which is incorporated by reference herein in its entirety.

FIELD OF INVENTION

The invention relates to a method for identifying a driving resistance of a motor vehicle having at least one drive train with a transmission, and also to a corresponding apparatus.

BACKGROUND OF THE INVENTION

Identification of a driving resistance of a motor vehicle is used, for example in connection with driver assistance devices such as speed control systems etc., to optimize these driver assistance systems for the motor vehicle, for example a controller of the drive train and an associated transmission.

An increased driving resistance of the motor vehicle is produced, for example, when driving up inclines on account of the downhill-slope force. A reduced driving resistance is produced, for example, when driving down slopes or when driving at a high altitude. In the latter case, said reduced driving resistance is caused by the associated lower atmospheric pressure, and therefore atmospheric density, since the aerodynamic resistance of the motor vehicle declines overall. At the same time, the engine usually also loses power when driving at a relatively high altitude since more force has to be expended in order to draw a fuel mixture into the respective cylinders of the engine.

DE 10 2004 023 580 A1, which is incorporated by reference, has disclosed taking into account the driving resistance for controlling a driving speed by determining a current driving resistance for determination purposes.

DE 10 2006 000 431, which is incorporated by reference, A1 has further disclosed a speed control method for motor vehicles which determines a driving resistance on the basis of stored values.

DE 10 2007 055 757, which is incorporated by reference, discloses adapting a driving resistance in a driving mode of the motor vehicle by means of correction values for a previously stored driving resistance.

Finally, EP 0 944 498 B1, which is incorporated by reference has disclosed a method for determining a driving resistance in which acceleration values from a reference model are compared with actually determined values.

SUMMARY OF THE INVENTION

The method according to aspects of the invention has the advantage that the quality and reliability of the driving resistance identification process is considerably improved compared to driving resistance identification processes which have been known to date. At the same time, this also makes it possible to identify the driving resistance independently of the motor vehicle, and therefore it is no longer necessary for a corresponding model to be determined and stored in the respective motor vehicle for each specific model of motor vehicle. Each motor vehicle can be provided with a certain, standardized model for the driving resistance with corresponding values for the respective parameters which are relevant for the model of the driving resistance. These are then correspondingly adapted and optimized during the course of the operating time of the motor vehicle. This permits, firstly, cost reductions in terms of development of the motor vehicle and, at the same time, likewise ensures that the identification of the driving resistance is continuously adapted to changes caused by the advancing age of the motor vehicle.

The three driving states of the motor vehicle in this case allow the driving states to be taken into account substantially completely during operation of a motor vehicle in order to determine or to identify the driving resistance. The driving state of an open drive train corresponds, for example, to coasting of the motor vehicle, that is to say a motor vehicle which is moving but is not being actively driven. This kind of driving state occurs, for example, when the transmission of the motor vehicle is in the neutral position, when the clutch is open or the motor vehicle therefore rolls or coasts. Rolling or coasting of the motor vehicle allows the identification of those speed-dependent and speed-independent variables of the driving resistance which act on the motor vehicle in every operating state. These include both external variables of the motor vehicle, for example increased aerodynamic resistance on account of roof racks, ambient temperature, air pressure etc., and also internal variables, for example drive train losses when the transmission is in a neutral position.

The second driving state corresponds to a driving state with a closed drive train with engine overrun. This second driving state therefore corresponds substantially to overrun operation of the motor vehicle and additionally allows the identification of drive train losses during the second driving state by calculating the difference in relation to the determined variables of the first driving state.

The third driving state corresponds to a driving state of the motor vehicle with a closed drive train and a positive engine torque. This third driving state therefore corresponds substantially to traction operation of the motor vehicle and additionally allows the identification of drive train losses during the third driving state by calculating the difference in relation to the determined variables of the first driving state.

According to a further advantageous development, the method comprises a further step, specifically of checking the recorded values of the control and/or state variables of the motor vehicle on the basis of prespecified conditions, such as maximum lateral acceleration and/or steering angle. The advantage of this is that the quality and reliability of the driving resistance identification process is further improved as a result. If, for example, the length of the control route, that is to say the route driven by the motor vehicle when values of the control and/or state variables are recorded, is not long enough, and/or the control route contains unevennesses, inclines, rapid changes in gradient, bends etc., which considerably influence the driving resistance, the recorded values of the control and/or state variables are not used for identifying the driving state, more precisely for adapting the vehicle model and/or the model of the surrounding area; the values are then all discarded. These prespecified conditions ensure that the motor vehicle is in a suitable driving state and distortions when identifying the driving resistance due to unusual or rapidly changing driving states are precluded. If, for example, the motor vehicle is driven around a bend, if the motor vehicle is struck by a gust of wind or if structural vibrations are produced in the motor vehicle by uneven roads, the respective recorded values of the control and/or state variables are discarded. The same also applies when the motor vehicle is stationary, for example is at a red light, or when the motor vehicle is braked.

According to a further preferred development of the invention, the method comprises a further step, specifically of checking the adapted parameters of the vehicle model and/or the model of the area surrounding the motor vehicle on the basis of prespecified quality conditions. The advantage of this is that additional checking on the basis of quality conditions improves the quality of the vehicle model and/or the model of the surrounding area, and therefore identification of the driving resistance, still further. The quality conditions can already be predefined or can be adapted continuously. In order to check whether the vehicle model and/or the model of the surrounding area satisfy/satisfies the quality conditions, for example, various parameters, which represent a driving resistance of a motor vehicle in the vehicle model and/or the model of the surrounding area, are, partly independently and partly in dependence on one another, in each case varied and then checked to determine the extent to which the respective variation of the parameter or parameters of the vehicle model and/or the model of the surrounding area, which models are to be adapted, for the driving resistance best reproduce a driving resistance which is calculated from the recorded values of the control and/or state variables. If the quality of the vehicle model and/or the model of the surrounding area is reduced, that is to say the driving resistance can be calculated or identified less accurately by means of the varied parameters of the vehicle model and/or the model of the surrounding area than before the variation of the parameters, the vehicle model and/or the model of the surrounding area is adapted, by varying the respective parameters, until a corresponding model quality of the vehicle model and/or the model of the surrounding area is achieved.

According to a further advantageous development, the method comprises a further step, specifically of checking the adapted parameters of the vehicle model and/or the model of the area surrounding the motor vehicle for plausibility, in particular on the basis of pre-existing and/or previously recorded values of control and/or state variables. The advantage of this is that checking the plausibility of the adapted parameters, for example by empirical values for specific parameters of the vehicle model and/or the model of the surrounding area being provided, ensures that changes in the vehicle model and/or the model of the surrounding area are only made for the driving resistance if they are within normal and/or meaningful ranges. Otherwise, the driving resistance would possibly ultimately be incorrectly determined, identified or calculated on account of implausible adapted parameters, this having a disadvantageous effect, for example on the behavior or the control of the motor vehicle, in particular in respect of comfort, fuel consumption etc. It is necessary to check for plausibility, for example, to prevent parameters of the vehicle model and/or the model of the surrounding area for identifying the driving resistance being varied when there is an irregular control route. If, for example, there are unevennesses along a control route on which the motor vehicle is being driven, the vehicle model and/or the model of the surrounding area may possibly be adapted correspondingly well by means of varying the parameters of the vehicle model and/or the model of the surrounding area, but the varied parameters correspond to an exceptional case and the driving resistance would be incorrectly identified on the carriageway, which is generally flat, when the unevennesses are no longer present.

If values of control and/or state variables of the motor vehicle which lead to implausible parameters for the vehicle model and/or the model of the surrounding area are continuously or mainly recorded over a certain time period, it is possible, in particular, to indicate to a driver of the motor vehicle that he should possibly visit a garage in order to determine the reason for this and to prevent the motor vehicle being damaged due to incorrect driving state determination.

According to a further advantageous development of the invention, the method is executed automatically during operation of the motor vehicle. The advantage of this is that the relevant parameters for identifying the driving resistance of the vehicle model and the model of the surrounding area can be continuously improved and adapted as a result.

BRIEF DESCRIPTION OF THE DRAWING FIGURES

The invention is best understood from the following detailed description when read in connection with the accompanying drawings. Included in the drawings are the following figures:

FIG. 1 shows a flowchart according to a first embodiment of the present invention;

FIG. 2 shows a block diagram of the apparatus according to a second embodiment of the present invention.

DETAILED DESCRIPTION OF THE INVENTION

In FIG. 1, reference symbol $S_1$ denotes the start of the method for identifying a driving resistance of a motor vehicle according to the first embodiment.

In a second step $S_2$, values of control and/or state variables of the motor vehicle during a driving state of the motor vehicle are recorded when a control route is covered. An example of a control variable is a speed to be adhered to which is preset by a speed control system. Examples of a state variable include a current speed of the motor vehicle, a selected gear of the transmission, a steering angle of the motor vehicle etc.

The respective driving state of the motor vehicle is determined in a third step $S_3$, with the distinction between driving states of the motor vehicle being made on the basis of three driving states, specifically a driving state of a closed drive train with a positive drive torque, a driving state of a closed drive train with engine overrun, and a driving state of the motor vehicle with an open drive train. In this case, the driving state with the open drive train is used to determine speed-dependent and speed-independent components of the driving resistance which act on the motor vehicle during each driving state.

In a fourth step $S_4$, a check is made to determine whether the recorded values of the control and/or state variables of the motor vehicle satisfy prespecified conditions. If the recorded values do not satisfy these conditions, the recorded values are discarded and the method is restarted at step $S_2$. The prespecified conditions ensure that the motor vehicle is in a suitable driving state and distortions due to unusual or rapidly changing driving states are precluded.

If these recorded values satisfy the prespecified conditions, the current vehicle model and/or the model of the surrounding area is accessed in a fifth step $S_5$, and parameters of the current vehicle model and/or model of the surrounding area are correspondingly adapted for the respective one of the three driving states in a sixth step $S_6$.

In a seventh step $S_7$, a check is made to determine whether the quality of the vehicle model and/or the model of the surrounding area satisfies prespecified quality conditions. If this is not the case, step $S_6$ is carried out again and the corresponding parameters of the vehicle model and/or the model of the surrounding area are varied until the quality of the vehicle model and/or the model of the surrounding area are/is satisfactory.

Otherwise, the adapted parameters of the vehicle model and/or the model of the surrounding area are checked for plausibility in an eighth step $S_8$. If the adapted parameters of the vehicle model and/or the model of the surrounding area are implausible, the adapted parameters of the vehicle model and/or the model of the surrounding area are discarded and the method is restarted at step $S_2$. If the adapted parameters of the vehicle model and/or the model for the surrounding area are plausible, the present vehicle model and/or the model of the surrounding area are/is adapted, that is to say the varied parameters of the vehicle model and/or the model of the surrounding area are adopted and stored in a ninth step $S_9$.

The driving resistance is then identified on the basis of the improved vehicle model and/or the model of the surrounding area in a tenth step $S_{10}$.

FIG. 2 shows a block diagram of an apparatus according to the second embodiment of the invention, this apparatus being arranged in a motor vehicle. Disturbance variables 10, for example an incline which the motor vehicle is driven up, act on a drive train 1. In this case, a controller 2 transmits actuating variables 13 to the drive train 1 for the purpose of controlling the drive train 1. In this case, the controller 2 also interacts with an accelerator pedal (not shown) of a motor vehicle, said accelerator pedal transmitting a driver demand into a corresponding torque of the drive train 1 by means of an actuating variable 13, in order to compensate a disturbance variable 10 which acts on the drive train 1. Furthermore, the drive train 1 transmits a state variable 11, which corresponds to the respectively relevant state of said drive train, to a driving resistance identification means 3. The drive train 1 and/or the controller 2 likewise transmit control variables 12 to the driving resistance identification means 3. The driving resistance identification means 3, for the purpose of identifying the driving resistance, identifies the driving resistance on the basis of the state variables 11, the control variables 12 and the actuating variables 13 and, in the process, distinguishes between whether the driving state of the motor vehicle corresponds to a driving state of a closed drive train with a positive drive torque, a driving state of a closed drive train with engine overrun, or a driving state with an open drive train, in particular with a neutral transmission position. The driving resistance identification means 3 uses a model $M_U$ of the surrounding area and a vehicle model $M_F$ for the purpose of identifying the driving resistance. In this case, the controller uses the model $M_U$ of the surrounding area and the vehicle model $M_F$ to control the drive train in an optimum manner by means of the actuating variables 13.

In order to improve the identification of the driving resistance of the motor vehicle by means of the driving resistance identification means 3, the model $M_u$ of the surrounding area and/or the vehicle model $M_F$ are/is adapted by means of respective adaptation $14_1$, $14_2$ of the respective parameters of the respective model by the driving resistance identification means 3. Therefore, firstly, high-quality and reliable identification of the driving resistance is possible and, secondly, a single standard model or only a few standard models for the surrounding area and/or the vehicle can be used for various models of the motor vehicle to identify the driving resistance, which is then automatically adapted by the adaptation of the model or the models to the model-specific special features of the respective motor vehicle, this already being done after a relatively short time during normal operation of the motor vehicle.

It is also possible to use the identification of the driving resistance, for example, to identify an excessively low air pressure in tires of the motor vehicle or else a corresponding increase in average consumption. It is likewise possible to use, in particular, the state of an open drive train to determine respective losses when transmitting drive power to the transmission or to the drive train individually for various motor vehicles, without a model of the surrounding area and/or a vehicle model having to be provided for each model of a motor vehicle in a manner specially matched to said model.

Although the present invention has been described on the basis of preferred exemplary embodiments above, it is not restricted to said exemplary embodiments, but rather can be modified in many ways.

The invention claimed is:

1. A method for identifying a driving resistance of a motor vehicle having at least one drive train with a transmission, comprising the steps of:
   recording values of control and/or state variables of the motor vehicle during a driving state of the motor vehicle when a control route is covered,
   adapting, using a controller of the motor vehicle, parameters of a vehicle model and/or a model of an area surrounding the motor vehicle on the basis of the values of the recorded control and state variables,
   identifying the driving resistance on the basis of the adapted vehicle model and/or the model of the surrounding area,
   wherein the parameters of the vehicle model and/or the model of the surrounding area are adapted on the basis of a distinction between driving states of the motor vehicle,
   wherein the driving states comprise at least two of driving states of a closed drive train with a positive drive torque, a driving state of a closed drive train with engine overrun, and a driving state with an open drive train.

2. The method as claimed in claim 1, comprising the further step of checking the recorded values of the control and/or state variables of the motor vehicle on the basis of prespecified conditions including length of the control route, maximum lateral acceleration and/or steering angle.

3. The method as claimed in claim 1, comprising the further step of
   checking the adapted parameters of the vehicle model and/or the model of the area surrounding the motor vehicle on the basis of prespecified quality conditions.

4. The method as claimed in claim 1, comprising the further step of checking the adapted parameters of the vehicle model and/or the model of the surrounding area for plausibility.

5. The method as claimed in claim 1, comprising the further step of checking the adapted parameters of the vehicle model and/or the model of the surrounding area for plausibility on the basis of values which have already been recorded.

6. The method as claimed in claim 1, wherein the method is executed automatically when the motor vehicle is being driven.

7. The method as claimed in claim 1, wherein the driving state with an open drive train is a neutral transmission position.

8. The method as claimed in claim 1, wherein the at least one of the vehicle model and the model of the surrounding area is common to motor vehicles of different models.

* * * * *